United States Patent [19]

Bass

[11] Patent Number: 4,999,637

[45] Date of Patent: Mar. 12, 1991

[54] CREATION OF ARTIFICIAL IONIZATION CLOUDS ABOVE THE EARTH

[75] Inventor: Ronald M. Bass, Houston, Tex.

[73] Assignee: APTI, Inc., Washington, D.C.

[21] Appl. No.: 49,881

[22] Filed: May 14, 1987

[51] Int. Cl.$^5$ ............................................... H04B 7/00
[52] U.S. Cl. ......................................... 342/367; 342/5
[58] Field of Search ................. 361/231; 342/352, 5, 342/367; 376/123, 124

[56] References Cited

U.S. PATENT DOCUMENTS

| | | | |
|---|---|---|---|
| 3,133,250 | 5/1964 | Molmud | 342/352 |
| 3,174,150 | 1/1965 | Sferrazza et al. | 342/352 |
| 3,189,901 | 6/1965 | Cutolo | 342/350 |
| 3,300,721 | 1/1967 | Seaton | 342/352 |
| 3,445,844 | 5/1969 | Grossi et al. | 342/367 |
| 3,518,670 | 6/1970 | Miller | 342/5 |
| 3,882,393 | 5/1975 | Epstein | 455/59 |
| 4,035,726 | 7/1977 | Brice et al. | 342/352 |
| 4,686,605 | 8/1987 | Eastlund | 361/231 |
| 4,712,155 | 12/1987 | Eastlund et al. | 361/231 |

OTHER PUBLICATIONS

Radio Science, vol. 15, No. 2, pp. 213–223, (4/80), "MST Radar at Poker Flat, Alaska", Balsley et al.

Primary Examiner—Salvatore Cangialosi
Attorney, Agent, or Firm—Drude Faulconer

[57] ABSTRACT

A method for forming a cloud of artificial ionization above the earth by initially heating the resident plasma at a desired altitude with electromagnetic radiation having a frequency approximately the same as that of the ambient plasma. As the plasma frequency increases due to heating, the radiation frequency is also increased until the final maintenance frequency is attained.

11 Claims, 1 Drawing Sheet

CREATION OF ARTIFICIAL IONIZATION CLOUDS ABOVE THE EARTH

DESCRIPTION

1. Technical Field

The present invention relates to a method for establishing a patch or cloud of artificial ionization above the earth and more particularly, relates to a method of forming a cloud of artificial ionization by heating naturally occurring plasma with electromagnetic energy which is transmitted from the Earth's surface at a variable, increasing frequency.

2. Background Act

Certain communication and radar systems operate by "bouncing" transmitted and/or reflected signals off of naturally-occurring layers of ionization in the ionosphere. One known system using this technique is "over-the-horizon" (OTH) radar. By bouncing or reflecting the signals off an ionized layer, the signals can actually travel "over-the-horizon", thereby substantially increasing the range of the system.

However, while present OTH systems are capable of detecting objects at long range (e.g. strategic threats), they are not well suited for detecting "close-in" objects (e.g. missiles at 1000 kilometers or less). One problem lies in the fact that as the beam angle of the radar is increased from the horizontal, the frequency of the beam must be lowered in order to achieve refraction at a more nearly normal incidence. As this frequency is lowered, the antenna system gain is reduced and the radar cross section decreases for small close-in object. These effects act to set a minimum range for the OTH system.

Another major problem with present OTH systems is related to the low radar cross section of small targets at typical OTH operating frequencies. These objects having small cross-sections produce a weak return signal even when the object is within the range of the OTH radar since the OTH system is normally designed for objects having much larger cross-sections, e.g. large aircraft.

A still further problem encountered by present OTH radar is directly related to the unstable conditions in the ionosphere which widely vary depending on seasonal, diurnal, and/or sunspot cycles. Accordingly, the operating frequency of present OTH radar systems has to be constantly adjusted to allow for the varying ionospheric conditions which may vary so much at times that the OTH system is rendered inoperable.

Several techniques have been proposed to overcome some of the shortfalls of present OTH radar systems. One known technique is disclosed in U.S. Pat. No. 3,445,844 wherein a cloud of artificial ionization is formed above the earth to serve as a layer for redirecting communication signals. The cloud is formed by "breakdown", i.e. creation of a high level flux of free electrons (i.e. plasma) at a desired altitude by focusing electromagnetic energy thereon to heat a localized region or area. The electromagnetic energy heats and accelerates the electrons in the resident plasma to a degree such that their kinetic energy reaches the level required for the occurrence of ionizing collisions. Scattering from a cloud so formed takes place due to the discontinuity between this zone of enhanced ionization and the surrounding medium.

A cloud formed in accordance with the method disclosed in U.S. Pat. No. 3,445,844 will provide a good reflection layer for OTH radar and like systems. However, when a cloud is formed by breakdown as in the mentioned patent, the plasma frequency of the cloud quickly adjusts to the hating frequency and breakdown is initiated over the entire area of the cloud. By initiating and forming the cloud with radiation having the same high frequency as that required for continued maintenance of the cloud once formed, a substantial amount of power is required, much of which is reflected or passes through the cloud while it is being formed and, accordingly, is wasted.

BRIEF DESCRIPTION OF THE DRAWINGS

The actual construction, operation, and apparent advantages of this invention will be better understood by referring to the drawings in which like numerals identify like parts and in which.

DISCLOSURE OF THE INVENTION

The present invention provides a method for forming a patch or cloud of artificial ionization at an altitude above the earth wherein no substantial amounts of power are wasted in forming and maintaining the cloud.

More specifically, the present invention provides a method wherein variable frequency heating is used to form a cloud of artificial ionization. This is accomplished by initially heating the resident plasma at the selected altitude by transmitting electromagnetic radiation from the earth at an initial frequency which is approximately the same frequency as the ambient plasma frequency. This radiation, being of the same frequency as the plasma, will be efficiently absorbed with relatively little being reflected from or passed through the ambient plasma. The radiation heats the plasma and accelerates the free electrons in the plasma thereby increasing the plasma frequency.

The frequency of the plasma is monitored by radar or the like and, as it increases, the frequency of the radiation being transmitted also increases, preferably in a manner where the radiation frequency continues to substantially match the increasing plasma frequency. The radiation frequency is continuously increased until the final maintenance frequency is attained, at which time, the transmission of electromagnetic radiation is continued at the final frequency to maintain the integrity of the cloud. The final plasma frequency (i.e. maintenance frequency) is selected so that it is always greater than the frequency of any signals (e.g. communications, radar) that are expected to be "bounced" off the cloud once the cloud is used for its intended purpose.

To further conserve power and to reduce the power required for carrying out this invention, the initial radiation is weakly focused so that only the center area of the plasma within the cloud are will undergo initial heating. The focus of the radiation is contracted as the radiation frequency is increased until the entire cloud are is heated by the radiation. The radiation can be transmitted by a single antenna system or by two spaced antenna systems positioned so that their beams intersect at said altitude to thereby form the cloud.

DESCRIPTION OF THE PREFERRED EMBODIMENTS

Figure 1:
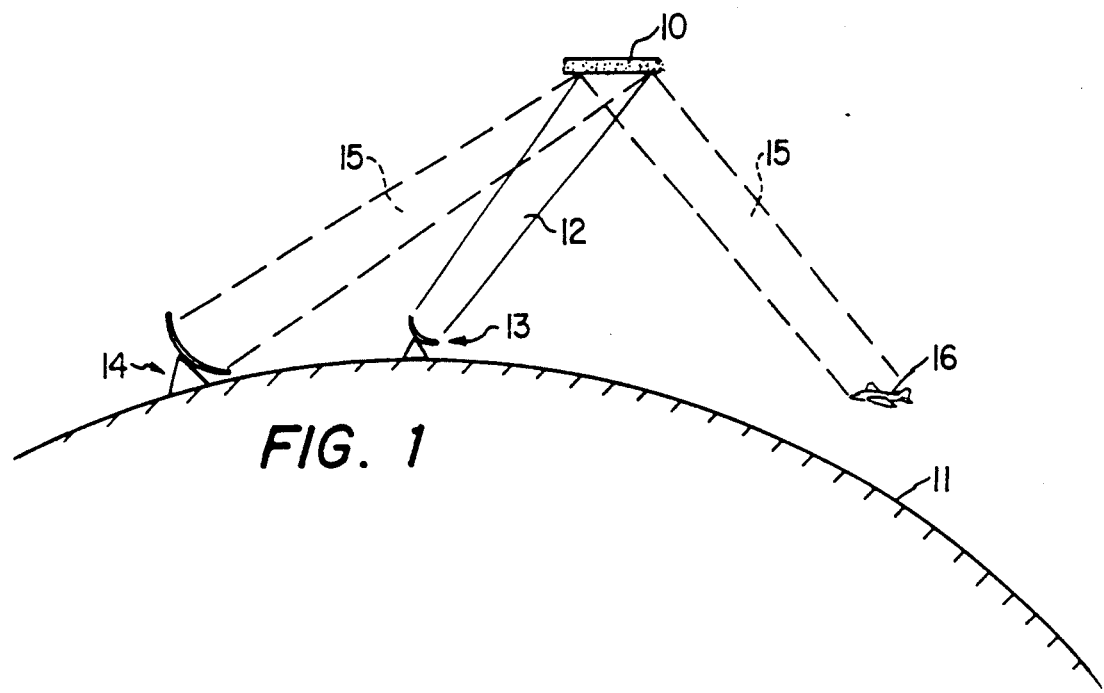
FIG. 1 is a simplified schematical view of a system for forming a cloud of artificial ionization above the earth for bouncing signals over-the-horizon in accordance with the present invention.

Referring more particularly to the drawings, FIG. 1 is a illustration of how the present invention is utilized with an over-the-horizon (OTH) radar system. A cloud 10 of artificial ionization is formed at an altitude above the surface of the earth 11 by transmitting electromagnetic energy 12 from an antenna system 13. An OTH radar system 14 transmits and receives signals 15 that are reflected off cloud 10 to detect a target 16 that is "over-the-horizon" as will be understood in the art.

In accordance with the present invention, cloud 10 is formed by variable frequency heating. The degree of ionization in the ionosphere depends on the electron temperature of the average energy of the free electrons; i.e. plasma, at a particularly altitude. The electron energy can be increased by absorption of incident electromagnetic radiation. This, in turn, increases the degree of ionization (i.e. number of free electrons and ions per unit volume). The higher the electron density of an ionized layer, the higher the frequency of radio or radar waves that can be reflected from that layer in communications or radar applications.

To raise the electron temperature efficiently, it is necessary to irradiate the ionosphere at or near the frequency of the plasma that is naturally present at the altitude of interest. "Plasma frequency" is defined roughly as the highest frequency that will be reflected from a particular altitude in the ionosphere and this frequency will increase as the electron density increases. However, if the frequency of the incident radiation used to heat the plasma is much higher or lower than the plasma frequency a large portion of the radiation will not be absorbed but will be reflected or passed through the heating zone and will be wasted.

In the present method, a target altitude at which cloud 10 is to be formed is selected and the frequency of the natural plasma is determined by tracking radar or the like. Heating is begun by transmitting electromagnetic radiation 12 from antenna system 13 at substantially the same frequency as that of the plasma resident at the target altitude. Radiation 12 is absorbed efficiently by the plasma at the target altitude which increase the electron density thereof which, in turn, increases the frequency of the plasma frequency. As the plasma frequency increases, the frequency of radiation 12 is increased to approximately match the increasing plasma frequency. By constantly tracking the increasing plasma frequency and adjusting the frequency of the heating radiation accordingly, almost all, if not all, of the power being used to heat the ionospheric electrons is absorbed efficiently into the plasma over the entire heating cycle. In this way, the electron density (degree of ionization) can be raised to the desired level without any substantial waste of power which otherwise would be considerable.

In the present method, the initial heating is carried out with the radiation 13 being broadly focused so that the central area within cloud 10 is being heated. As the plasma frequency within the smaller area is increased, the focused area of radiation 13 is contracted until the entire final area of cloud 10 is being heated by the radiation 13. This minimizes the initial heating power requirements and results in a further substantial reduction in the overall power requirements for forming cloud 10.

The antenna system 13 required to transmit radiation 12 in the present invention may be of any known construction having high direct inability capabilities; for example, a phased array, beam spread angle (O) type see U.S. Pat. No. 3,445,844 and the "The MST RADAR at Poker Flat, Ak.," Radio Science, Vol. 15, No. 2, March-April, 1980; pps. 213-223, both of which are incorporated herein by reference. A phased array antenna generating a steerable focused beam can be assembled at a single site or two phased array antenna systems 20, 21 (FIG. 2) may be spaced from each of other to generate two coherent beams 23, 24 of radiation that cross each other at the selected altitude to form cloud 10a.

Figure 2:
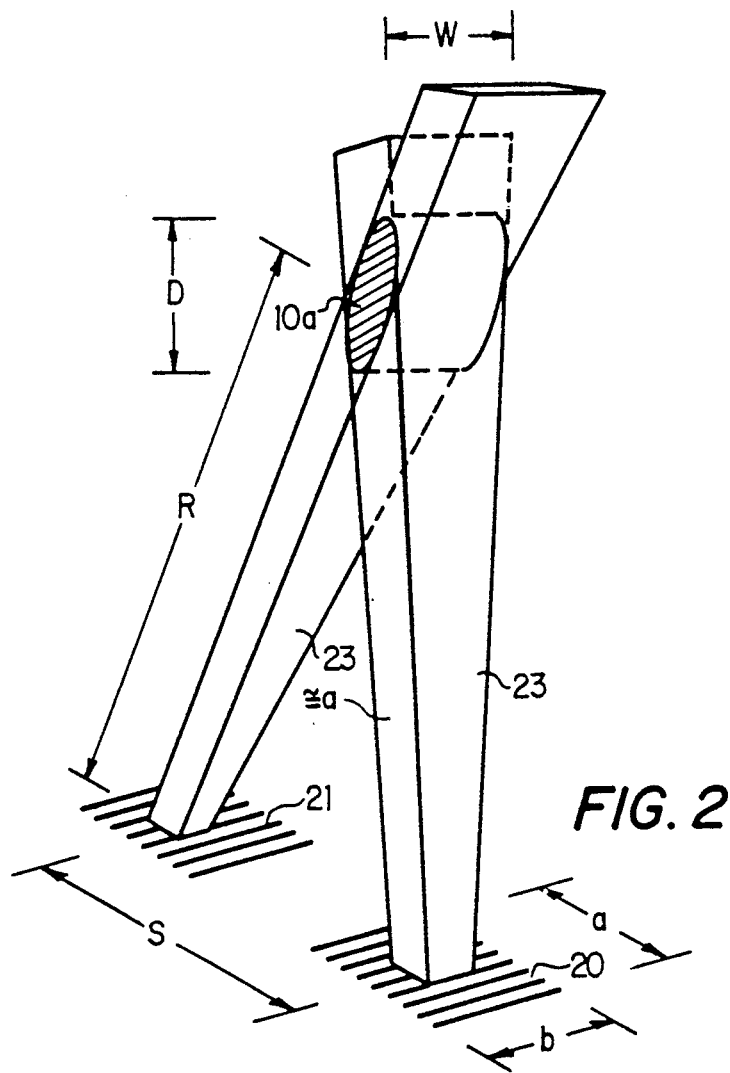
FIG. 2 is a schematic illustration of a cross-beam radiation transmission system for forming a cloud of artificial ionization in accordance with the present invention.

The key beam geometric parameters of a two antenna system are shown in FIG. 2. The beam of radiation from each antenna is assumed to diverge in the azimuthal plane (b) and to be collimated in the elevational plane (a). This assumption is appropriate for a backscatter cloud that must be inclined about 45 degrees from the horizontal. For forward scattering, with cloud 10a either directly overhead or downrange from an antenna, the beam will diverge in both planes and "b" would be used for both antenna. The following relationships can be used to calculate the various parameters of the system of FIG. 2:

$$a \simeq \sqrt{2 \lambda_p R} \quad (1)$$

wherein:
a = length of side of antenna array in elevational plane.
$\lambda p$ = Wavelength of Radiation Frequency
R = Actual distance from array to cloud 10a.

$$b \simeq \frac{\lambda_p R}{W} \quad (2)$$

wherein:
b = length of side of antenna array in azimuthal plane
W = Width of cloud 10a $$S = \frac{Ra}{D} \quad (3)$$

S = distance between arrays.
D = Depth of cloud 10a.

While the size and characteristics of a particular cloud 10 will vary depending on its application and actual conditions under which it is formed, the following example will serve to better illustrate the present invention. A cloud 10 (FIG. 1) is to formed at an altitude of 90 kilometers (km) and is to have a final area of 1 square km or larger with a thickness of from 3 to 10 meters. The resident plasma density at 90 km is typically on the order of $10^6$/cubic cm. A square, phased array antenna system 13 of 100 meters on a side, beams electromagnetic radiation 12 (i.e. power) at an initial or starting frequency to initiate heating of the resident plasma. Antenna 13 is focused so that only the plasma at the center of cloud 10 will initially be heated, thereby requiring substantially less power than if the entire 1 square km area of the cloud was originally heated.

Since the plasma frequency of the ambient plasma is approximately 9 megahertz ($MH_z$), about 70 MW of power will be required. As the plasma heats, the frequency thereof increased and is tracked by groundbased radar. As the frequency of the plasma increases, the frequency of radiation 12 is increased accordingly until a frequency of 15 MHz is reached. The power requirement at this point will have dropped to approximately 27 MW.

At this point, the focus of the antenna is contracted to cover a greater, if not all, of the area of cloud 10, and radiation 12 (i.e. heating) is now applied over the entire area. Due to the increased heating area, the power requirement is temporarily increased to approximately 33 MW but will quickly decrease as the radiation frequency continues to increase until the final maintenance frequency of 300 $MH_z$ is reached. The power requirement for the final maintenance frequency is approximately 7 MW and final electron or plasma density will be about $10^9$/cubic cm.

The integrity of cloud 10 will be maintained as long as radiation 12 is transmitted thereto at the final maintenance frequency. The final maintenance frequency for any particular cloud is interrelated to the frequency of the radar or other communication signal which is to be bounced off that cloud. That is, it is generally preferably to have the plasma frequency of the cloud substantially higher than the radar frequency. This will ensure a high degree of reflection for the radar. Also, irregularities in the plasma density may form in the cloud. These will commonly be spaced about one heater wavelength apart. This spacing should be relatively small compared to a radar wavelength to avoid excessive scattering of the radar signal in undesirable directions.

What is claimed is:

1. A method of forming a cloud of artificial ionization at an altitude above the earth, said method comprising:
   initiating heating of the resident plasma at said altitude by transmitting electromagnetic radiation from the earth to said altitude at an initial frequency which is approximately the same as the original frequency of said resident plasma; and
   increasing said frequency of said electromagnetic radiation as said frequency of said resident plasma increases, until a final maintenance frequency is attained, said maintenance frequency being t or above the plasma frequency necessary to provide a plasma having an electron density capable of reflecting communication or like signals which come into contact with said plasma.

2. The method of claim 1 including:
   defocusing said electromagnetic radiation so only the center area of said cloud is initially heated; and
   contracting the focus of said electromagnetic radiation as the frequency of said radiation is adjusted until the entire area of said cloud is heated.

3. The method of claim 1 wherein said electromagnetic radiation is transmitted by a single antenna system.

4. The method of claim 1 wherein said electromagnetic radiation is transmitted by two antenna systems, each spaced from the other, and inclined whereby the beams of said electromagnetic radiation transmitted from said systems will intersect each other at said altitude.

5. A variable frequency heating method for forming a cloud of artificial ionization at an altitude above the earth, said method comprising:
   transmitting electromagnetic radiation form the earth to said altitude at an initial frequency which is approximately the same as the original frequency of the plasma naturally present at said altitude;
   focusing said electromagnetic radiation to heat said plasma to thereby accelerate the free electrons therein thereby increasing the frequency of said plasma;
   monitoring the frequency of said plasma as it increases;
   increasing the frequency of said electromagnetic radiation as said frequency of said plasma increases;
   continuing to increase said frequency of said electromagnetic radiation until a final desired maintenance frequency is attained; said final desired frequency being at or above the plasma frequency necessary to provide a plasma having an electron density capable of reflecting communication signals or the like which come into contact with said plasma;
   and continuing to transmit said electromagnetic radiation at said final frequency to maintain the integrity of said cloud.

6. The method of claim 5 wherein said final frequency is greater than the frequency of any communication and/or radar signals expected to be reflected by said cloud.

7. The method of claim 6 wherein said electromagnetic radiation is initially focused whereby only the center area of said plasma is initially heated.

8. The method of claim 7 including:
   contracting the focus of said electromagnetic radiation as the said frequency of said radiation is increased whereby the entire area of said cloud is heated.

9. The method of claim 8 wherein said frequency of said electromagnetic radiation is increased to approximately match said increasing frequency of said plasma.

10. The method of claim 9 wherein said electromagnetic radiation is transmitted by a single antenna system.

11. The method of claim 9 wherein said electromagnetic radiation is transmitted by two antenna systems, each spaced from the other, and inclined whereby the beams of said electromagnetic radiation transmitted from said systems will intersect each other at said altitude.

* * * * *